US009754391B2

United States Patent
Sun et al.

(10) Patent No.: US 9,754,391 B2
(45) Date of Patent: Sep. 5, 2017

(54) WEBPAGE DISPLAY METHOD AND APPARATUS

(71) Applicant: TENCENT TECHNOLOGY (SHENZHEN) COMPANY LIMITED, Shenzhen (CN)

(72) Inventors: Haoran Sun, Shenzhen (CN); Chundong Hu, Shenzhen (CN); Lei Chen, Shenzhen (CN); Liang Zeng, Shenzhen (CN); Li Wan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 646 days.

(21) Appl. No.: 14/100,668

(22) Filed: Dec. 9, 2013

(65) Prior Publication Data
US 2014/0092084 A1 Apr. 3, 2014

(30) Foreign Application Priority Data

Aug. 28, 2012 (CN) .......................... 2012 1 0309479

(51) Int. Cl.
*G06T 11/20* (2006.01)
*G06F 17/30* (2006.01)
(Continued)

(52) U.S. Cl.
CPC ........ *G06T 11/20* (2013.01); *G06F 17/30905* (2013.01); *G09G 5/397* (2013.01);
(Continued)

(58) Field of Classification Search
CPC ......... G06T 11/20; G06T 15/20; G06T 15/40; G09G 5/399; G09G 5/397;
(Continued)

(56) References Cited

U.S. PATENT DOCUMENTS 7,528,839 B1 * 5/2009 Cunniff ..................... G06T 5/20
345/420
8,314,809 B1 * 11/2012 Grabowski ............. G06T 15/20
345/539

(Continued)

FOREIGN PATENT DOCUMENTS

CN 1538324 A 10/2004
CN 101008573 A 8/2007
(Continued)

OTHER PUBLICATIONS

The World Intellectual Property Organization (WIPO), International Search Report for PCT/CN2013/082128, Dec. 5, 2013.
(Continued)

*Primary Examiner* — Saptarshi Mazumder
(74) *Attorney, Agent, or Firm* — Anova Law Group, PLLC

(57) ABSTRACT

Webpage display methods and apparatus are provided herein. In an exemplary method, a webpage to be displayed can be obtained. The webpage can be sectioned into a plurality of sub-blocks. Sub-blocks corresponding to a first current screen can be rendered and displayed. A render-display operation can be performed. The render-display operation includes rendering sub-blocks adjacent to the first current screen and storing the rendered sub-blocks adjacent to the first current screen in a buffer. The render-display operation also includes reading and displaying rendered sub-blocks in the buffer corresponding to a second current screen when a screen moves. The render-display operation can be repeatedly performed.

19 Claims, 3 Drawing Sheets

(51) Int. Cl.
*G09G 5/397* (2006.01)
*G09G 5/399* (2006.01)

(52) U.S. Cl.
CPC ..... *G09G 5/399* (2013.01); *G09G 2320/0247* (2013.01); *G09G 2320/0252* (2013.01)

(58) Field of Classification Search
CPC ... G09G 2320/0247; G09G 2320/0252; G09G 5/393; G09G 2340/145; G09G 5/346; G06F 17/30905
See application file for complete search history.

(56) References Cited

U.S. PATENT DOCUMENTS

| | | | |
|---|---|---|---|
| 2005/0108266 A1* | 5/2005 | Cao | G06F 17/2229 |
| 2005/0154781 A1 | 7/2005 | Carlson et al. | |
| 2008/0184128 A1* | 7/2008 | Swenson | G09G 5/14 |
| | | | 715/738 |
| 2011/0191676 A1* | 8/2011 | Guttman | G06F 3/048 |
| | | | 715/716 |
| 2012/0066577 A1* | 3/2012 | Saini | G06F 17/30905 |
| | | | 715/211 |
| 2012/0256949 A1* | 10/2012 | Treat | G06F 9/4443 |
| | | | 345/629 |

FOREIGN PATENT DOCUMENTS

| | | |
|---|---|---|
| CN | 101359276 A | 2/2009 |
| CN | 101777068 A | 7/2010 |
| CN | 102209113 A | 10/2011 |
| CN | 102209114 A | 10/2011 |

OTHER PUBLICATIONS

The State Intellectual Property Office of the People's Republic of China (SIPO), Office Action 1 for 201210309479.8, Mar. 4, 2015.
The State Intellectual Property Office of the People's Republic of China (SIPO), Office Action 1 for 201210309479.8, Sep. 14, 2015.

* cited by examiner

300

WEBPAGE DISPLAY METHOD AND APPARATUS

CROSS-REFERENCES TO RELATED APPLICATIONS

This application is a continuation application of PCT Patent Application No. PCT/CN2013/082128, filed on Aug. 23, 2013, which claims priority to Chinese Patent Application No. 201210309479.8, filed on Aug. 28, 2012, the entire contents of all of which are incorporated herein by reference.

FIELD OF THE INVENTION

The present disclosure generally relates to smart terminal information display and, more particularly, relates to webpage display methods and apparatus.

BACKGROUND

Nowadays, smart terminals, such as smart phones and tablet computers, are becoming indispensable in people's lives, entertainment and work. Webpage browsing, as the most-frequently-used operation in entertainment and work, can influence smart terminals' user experience to a great extent. Improvements in the speed of webpage browsing can be achieved by improving the configuration of smart devices, and also by improving smart devices' webpage display efficiency.

In existing technology, there are two webpage display methods. In one method, the contents of a webpage are rendered all at once for displaying on a screen. Such a method obviously can consume considerable resources, so the display efficiency can be low. In the other method, a portion of the webpage is rendered only when that portion of the webpage is displayed in the current screen. Therefore, a white screen or flicker screen during the rendering process may appear on the screen.

The disclosed methods and systems are directed to solve one or more problems set forth above and other problems.

BRIEF SUMMARY OF THE DISCLOSURE

One aspect of the present disclosure includes a webpage display method. The method includes obtaining a webpage to be displayed and sectioning the webpage into a plurality of sub-blocks. The method also includes rendering and displaying sub-blocks corresponding to a first current screen. Further, the method includes performing a render-display operation. The render-display operation includes rendering sub-blocks adjacent to the first current screen and storing the rendered sub-blocks adjacent to the first current screen in a buffer. Further, the render-display operation includes reading and displaying rendered sub-blocks in the buffer corresponding to a second current screen when a screen moves. Still further, the render-display operation includes repeatedly performing the render-display operation.

Another aspect of the present disclosure includes a webpage display apparatus. The apparatus includes an obtaining module, a rendering module, a buffer module, a display module and a calling module. The obtaining module is configured to obtain a webpage to be displayed and section the webpage into a plurality of sub-blocks. The rendering module is configured to render sub-blocks corresponding to a first current screen, and to render sub-blocks adjacent to the first current screen. The buffer module is configured to store the rendered sub-blocks adjacent to the first current screen. The display module is configured to display the sub-blocks corresponding to the first current screen, and to read and display the rendered sub-blocks in the buffer module corresponding to a second current screen when a screen moves. The calling module is configured to call the rendering module to render sub-blocks adjacent to the second current screen and store the rendered sub-blocks adjacent to the second current screen in the buffer module, after the screen moves.

Another aspect of the present disclosure includes a non-transitory computer-readable medium having computer program. When being executed by a processor, the computer program performs performing a webpage display method. The method includes obtaining a webpage to be displayed and sectioning the webpage into a plurality of sub-blocks. The method also includes rendering and displaying sub-blocks corresponding to a first current screen. Further, the method includes performing a render-display operation. The render-display operation includes rendering sub-blocks adjacent to the first current screen and storing the rendered sub-blocks adjacent to the first current screen in a buffer. Further, the render-display operation includes reading and displaying rendered sub-blocks in the buffer corresponding to a second current screen when a screen moves. Still further, the render-display operation includes repeatedly performing the render-display operation.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Figure 1:
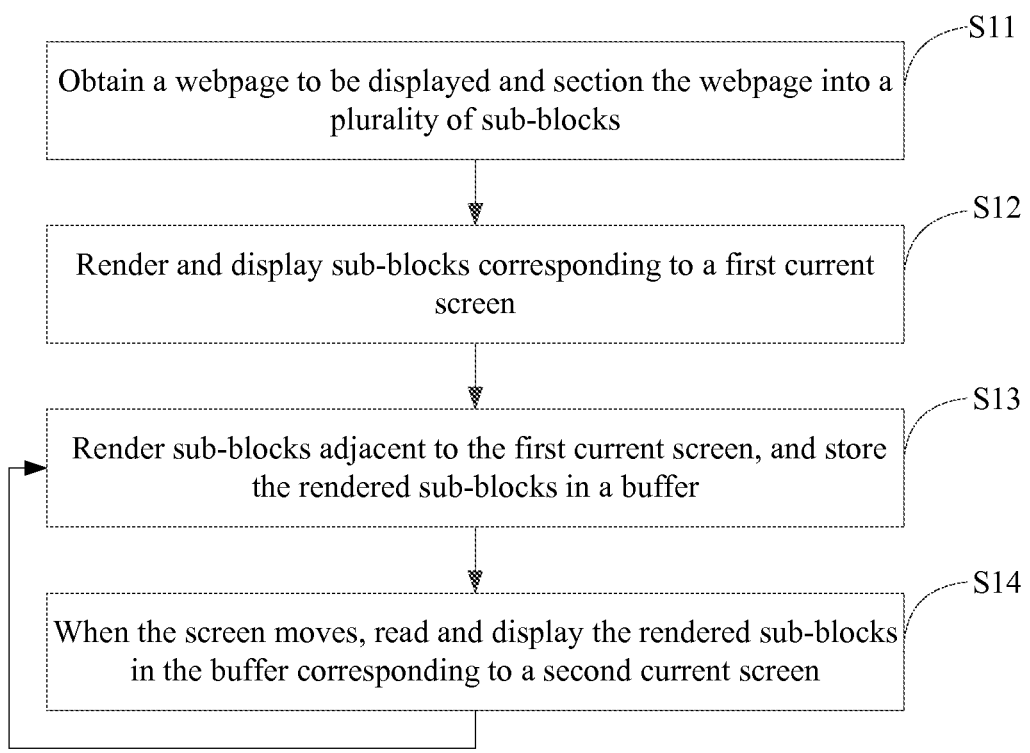
FIG. 1 depicts a flow diagram of an exemplary webpage display method in accordance with various disclosed embodiments.

Reference will now be made in detail to exemplary embodiments of the invention, which are illustrated in the accompanying drawings.

Various disclosed embodiments provide webpage display methods and apparatus. In an exemplary method, a webpage to be displayed can be obtained. The webpage can be sectioned into a plurality of sub-blocks. Sub-blocks corresponding to a first current screen can be rendered and displayed. Next, a render-display operation can be performed. Sub-blocks adjacent to the first current screen can be rendered, and the rendered sub-blocks can be stored in a buffer (or a buffer memory). When the screen moves, the rendered sub-blocks in the buffer corresponding to a second current screen can be read and displayed. After the screen moves, such render-display operation can be repeatedly performed. Thus, after the screen moves, sub-blocks adjacent to the second current screen can be rendered and stored in the buffer.

A screen, or a display screen, may refer to a display device on an electronic device such as a smart terminal. In addition, wherever applicable, a screen (or a display screen) may also refer to an area that defines the contents (e.g., a portion of a webpage) to be displayed on the display device. Boundaries of the screen (e.g., top, bottom left and/or right boundaries of the screen) can determine the contents to be displayed on the display device.

Correspondingly, a current screen may refer to an area that defines the contents to be displayed on the display device currently. Boundaries of the current screen can determine the contents to be displayed on the display device currently.

When part or all of a webpage is displayed on a screen, the webpage can move relatively to the screen (e.g., by scrolling or dragging). In effect, the screen moves relative to the webpage. In other words, the position of the current screen changes. Such relative movement can result in a change of displayed contents in the current screen. As a result, the current screen changes. For example, a first current screen can change to a second current screen, and so on.

According to various disclosed embodiments, an exemplary webpage display apparatus can include an obtaining module, a rendering module, a buffer module, a display module, and a calling module. The obtaining module is configured to obtain a webpage to be displayed. The webpage can be sectioned into a plurality of sub-blocks. The rendering module is configured to render sub-blocks corresponding to a first current screen, and to render sub-blocks adjacent to the first current screen. The buffer module is configured to store the rendered sub-blocks adjacent to the first current screen. The display module is configured to display the rendered sub-blocks corresponding to the first current screen, and to read and display rendered sub-blocks in the buffer module when the screen moves. The calling module is configured to call the rendering module after the screen moves (i.e., after the position of the 0 current screen changes), to render sub-blocks adjacent to a second current screen and to store the rendered sub-blocks in the buffer module.

According to the webpage display methods and apparatus disclosed herein, at the same time of displaying a first current screen, sub-blocks adjacent to the first current screen can be continuously rendered at backstage and stored in a buffer. When scrolling or dragging of the webpage causes the first current screen to change to a second current screen, the rendered sub-blocks in the buffer corresponding to the second current screen can be retrieved and displayed. As a result, there can be less resource consumption. In addition, sub-blocks displayed on the screen have all been rendered beforehand. Thus, display speed can be fast. Phenomena during moving of the webpage (e.g. by scrolling, dragging, etc.) such as white screen or flicker screen can also be prevented. So desired user experience can be achieved.

Figure 3:
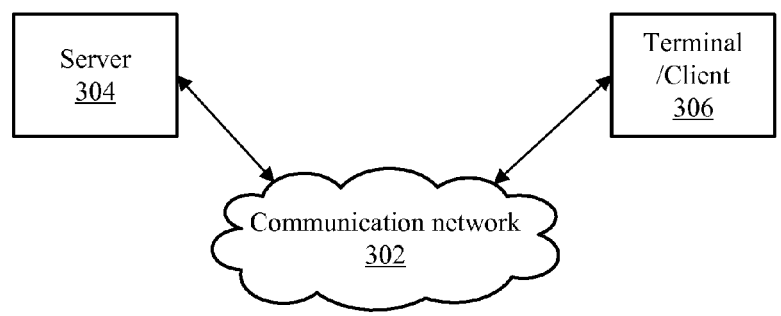
FIG. 3 depicts an exemplary environment incorporating certain disclosed embodiments.

FIG. 3 depicts an exemplary environment 300 incorporating exemplary webpage display methods and apparatus in accordance with various disclosed embodiments. As shown in FIG. 3, the environment 300 can include a server 304, a terminal 306, and a communication network 302. The server 304 and the terminal 306 may be coupled through the communication network 302 for information exchange, such as Internet searching, webpage browsing, etc. Although only one terminal 306 and one server 304 are shown in the environment 300, any number of terminals 306 or servers 304 may be included, and other devices may also be included.

The communication network 302 may include any appropriate type of communication network for providing network connections to the server 304 and terminal 306 or among multiple servers 304 or terminals 306. For example, the communication network 302 may include the Internet or other types of computer networks or telecommunication networks, either wired or wireless.

A terminal, as used herein, may refer to any appropriate user terminal with certain computing capabilities, such as a personal computer (PC), a work station computer, a hand-held computing device (tablet), a mobile terminal (a mobile phone or a smart phone), a smart terminal, or any other user-side computing device.

A server, as used herein, may refer to one or more server computers configured to provide certain server functionalities, such as search engines and webpage browsing. A server may also include one or more processors to execute computer programs in parallel.

Figure 4:
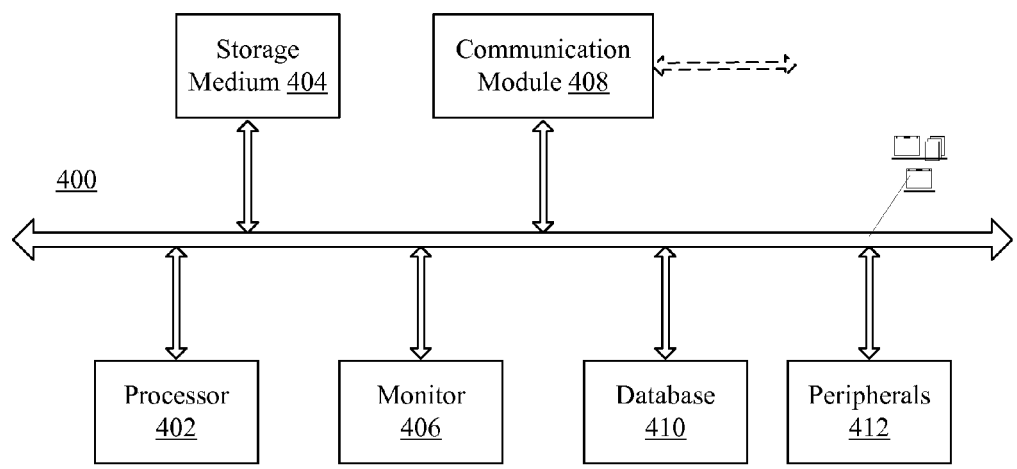
FIG. 4 depicts an exemplary computing system consistent with the disclosed embodiments.

The server 304 and the terminal 306 may be implemented on any appropriate computing platform. FIG. 4 shows a block diagram of an exemplary computing system 400 capable of implementing the server 304 and/or the terminal 306. As shown in FIG. 4, the exemplary computer system 400 may include a processor 402, a storage medium 404, a monitor 406, a communication module 408, a database 410, peripherals 412, and one or more bus 414 to couple the devices together. Certain devices may be omitted and other devices may be included.

The processor 402 can include any appropriate processor or processors. Further, the processor 402 can include multiple cores for multi-thread or parallel processing. For example, when certain sub-blocks of a webpage are rendered and displayed on a display screen of a terminal, multi-thread processing can be used to render other sub-blocks of the webpage at backstage for storing in a buffer memory. The storage medium 404 may include memory modules, such as ROM, RAM, and flash memory modules, and mass storages, such as CD-ROM, U-disk, removable hard disk, etc. The storage medium 404 may store computer programs for implementing various processes, when executed by the processor 402. For example, the storage medium 404 can provide buffer memory storage during webpage browsing. The buffer memory storage can include cache, RAM, any other suitable memory storage, or a combination thereof.

The monitor 406 may include display devices, such as display screens, for displaying contents of the computing devices such as webpages, etc. The peripherals 412 may include I/O devices such as keyboard and mouse used by user for certain operations, such as scrolling or dragging a webpage that is displayed by the monitor 406.

Further, the communication module 408 may include network devices for establishing connections through the communication network 302. The database 410 may include one or more databases for storing certain data and for performing certain operations on the stored data, such as webpage browsing, etc.

In operation, the terminal 306 may cause the server 304 to perform certain actions, such as an Internet search or browsing webpages. The server 304 may be configured to provide structures and functions for such actions and operations. More particularly, when a user-side device such as a smart terminal sends a request of browsing a webpage, the server 304 may provide data of the webpage to the smart terminal.

In various embodiments, a terminal such as a smart terminal involved in the disclosed methods and systems can include the terminal 306, while a server or network server involved in the disclosed methods and systems can include the server 304. In various embodiments, the disclosed methods and apparatus can be executed by a terminal, such as a smart terminal.

FIG. 1 depicts a flow diagram of an exemplary webpage display method in accordance with various disclosed embodiments. In Step S11, a webpage to be displayed is obtained. The webpage can be sectioned into a plurality of sub-blocks.

A request of browsing a webpage can be sent by the smart terminal to an existing network server, so data of the webpage to be displayed can be returned by the network server and thus be obtained. In one embodiment, the size of the webpage can be a multiple of the size of a screen of the smart terminal. During a displaying process, vertically scrolling or horizontally dragging the webpage may be needed to completely browse the webpage.

The webpage can be sectioned into a plurality of sub-blocks. In specific, certain information of elements in the webpage document (e.g., HTML document) can be parsed out by an initial parsing process. The elements can include various component elements in a webpage, such as text boxes, labels, radio buttons, picture controls, etc. Such an initial parsing can give information such as position of elements and where each element should appear relative to the screen, i.e., the information necessary for sectioning the webpage. The webpage can thus be sectioned into a plurality of sub-blocks of predetermined size(s). Each sub-block may have zero to one or more elements. As may be appreciated by one skilled in the art, suitable parsing and sectioning algorithms may be implemented (e.g., using browser programming languages C++ or Java, etc.) to enable such parsing and sectioning.

In Step S12, sub-blocks of the webpage that correspond to a first current screen are rendered and displayed.

In one embodiment, during the rendering and displaying of the sub-blocks of the webpage that corresponds to the first current screen, steps can be detailed as follows.

First, elements corresponding to the first current screen can be parsed out. The parsing herein can extract essential information such that the elements can be rendered and then displayed on a screen. Next, the parsed-out elements corresponding to the first current screen can be rendered. At last, the rendered contents can be displayed on the screen of the smart terminal.

The elements can include various component elements in a webpage, such as text boxes, labels, radio buttons, picture controls, etc. A process of rendering can include, for example, converting parsed elements into pixels as an output. Displaying the rendered contents on the screen of the smart terminal can include outputting pixel data to a display device, e.g., a liquid crystal display screen, for displaying.

In Step S13, sub-blocks adjacent to the first current screen are rendered. The rendered sub-blocks can be then stored in a buffer.

Similar to the rendering and displaying of the sub-blocks corresponding to the first current screen as depicted in Step S12, the rendering of the sub-blocks adjacent to the first current screen can include parsing the elements adjacent to the first current screen and then rendering the parsed-out elements. The rendering sub-blocks adjacent to the first current screen is stored in a buffer, and can then be ready for retrieving in a subsequent displaying step.

In one embodiment, rendering sub-blocks adjacent to the first current screen can include rendering sub-blocks within about one screen height from the top or bottom boundary of the first current screen, and/or rendering sub-blocks within about one screen width from the left or right boundary of the first current screen.

As used herein, one screen height refers to the height of one screen. One screen width refers to the width of one screen.

Thus, the sub-blocks of the four screens respectively adjacent to the top, bottom, left and right boundaries of the first current screen can be rendered, and then stored in the buffer. However, in the present disclosure, sub-blocks adjacent to a current screen (e.g., the first current screen) are not limited to the sub-blocks within about one screen height or about one screen width from one of the boundaries of the current screen.

In Step S14, when the screen moves, contents of the rendered sub-blocks in the buffer are read and displayed.

When the webpage is scrolled vertically or dragged horizontally, the portion of the webpage corresponding to the new current screen (i.e., a second current screen) can be different from the portion of the webpage corresponding to the first current screen. At that time, contents of the rendered sub-blocks that correspond to the second current screen can be retrieved (or read) from the buffer and displayed on the screen of the smart terminal.

According to various disclosed embodiments, after Step S14, Steps S13-S14 can form a render-display operation, and can be repeatedly performed. Specifically, after Step S14, sub-blocks adjacent to the second current screen can be rendered and stored in the buffer. When the screen moves, contents of the rendered sub-blocks in the buffer can be read and displayed. For example, when moving of the screen results in a next current screen (e.g., a third current screen), the rendered sub-blocks in the buffer corresponding to the third current screen can be read and displayed.

According to various disclosed embodiments, sub-blocks corresponding to a current screen can be rendered and displayed. At the same time, sub-blocks adjacent to the current screen can be continuously rendered at backstage and stored in a buffer. When the webpage is scrolled or dragged, the rendered sub-blocks in the buffer can be retrieved and displayed. Thus, during the scrolling of the webpage, at the same time of displaying the current screen, sub-blocks for the next screen can be rendered at backstage beforehand. Compared with the method of rendering an entire webpage all at once, the method as disclosed herein can result in less resource consumption. In addition, sub-blocks displayed on the screen have all been rendered beforehand, so display speed can be fast. Phenomena such as white screen or flicker screen can also be prevented. Thus, desired user experience can be achieved.

Optionally, between Step S13 and Step S14, the method can further include releasing, from the buffer, the sub-blocks beyond preset distance(s) from one or more boundaries of the current screen (e.g., the first current screen). In one embodiment, the releasing of the sub-blocks can be executed between Step S13 and Step S14 during the repeatedly-performed render-display operation.

For example, after the rendered sub-blocks adjacent to the first current screen are stored in the buffer, sub-blocks beyond about one screen height from the top or bottom boundary of the first current screen can be released from the buffer. Also, sub-blocks beyond about one screen width from the left or right boundary of the first current screen can be released from the buffer. Therefore, in this example, the buffer can store at most the sub-blocks of the four screens adjacent to the boundaries of the first current screen. Thus, internal memory can be effectively saved, and system resource consumption can be reduced.

Figure 2A:
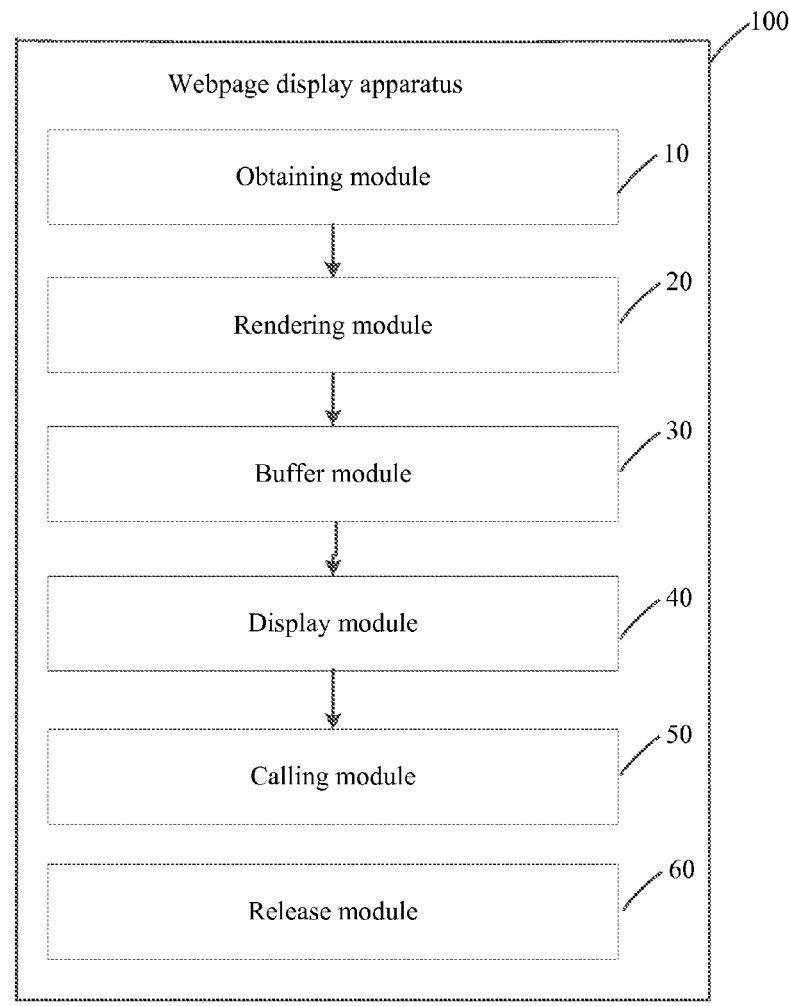
FIG. 2A depicts a structure diagram of an exemplary webpage display apparatus in accordance with various disclosed embodiments.

FIG. 2A depicts a structure diagram of an exemplary webpage display apparatus in accordance with various disclosed embodiments. The apparatus as disclosed can correspond to the webpage display method according to various disclosed embodiments, e.g. as depicted in Steps S11-S14. An exemplary webpage display apparatus 100 can include an obtaining module 10, a rendering module 20, a buffer module 30, a display module 40, and/or a calling module 50. Certain modules may be omitted and other modules may also be included.

The webpage display apparatus can be used by various smart terminals connected to a server via wired or wireless network, such as mobile phones, pocket personal computers (PPCs), palmtop computers, computers, notebook computers, personal digital assistants (PDAs), etc. (e.g., terminal 306).

As shown in FIG. 2A, webpage display apparatus 100 includes an obtaining module 10, a rendering module 20, a buffer module 30, a display module 40, a calling module 50, and a release module 60. Certain module may be omitted and other module may be added.

The obtaining module 10 is configured to obtain a webpage to be displayed by the webpage display apparatus 100. The webpage can include a plurality of sub-blocks.

In one embodiment, the webpage display apparatus 100 can send a request of browsing a webpage to an existing network server. So data of the webpage to be displayed can be returned by the network server and thus be obtained by the webpage display apparatus 100. In one embodiment, the size of the webpage can be a multiple of the size of a screen of the smart terminal. During a displaying process, vertically scrolling or horizontally dragging the webpage may be needed to completely browse the webpage.

The obtaining module 10 is also configured to section the webpage into a plurality of sub-blocks. In specific, certain information of elements in the webpage document (e.g., HTML document) can be parsed out by an initial parsing process. The elements can include various component elements in a webpage, such as text boxes, labels, radio buttons, picture controls, etc. Such an initial parsing can give information such as position of elements and where each element should appear relative to the screen, i.e., the information necessary for sectioning the webpage. The webpage can thus be sectioned into a plurality of sub-blocks of predetermined size(s). Each sub-block may have zero to one or more elements. As may be appreciated by one skilled in the art, suitable parsing and sectioning algorithms may be implemented to enable the initial parsing and sectioning.

The rendering module 20 is configured to render sub-blocks corresponding to a first current screen, and to render sub-blocks adjacent to the first current screen.

Figure 2B:
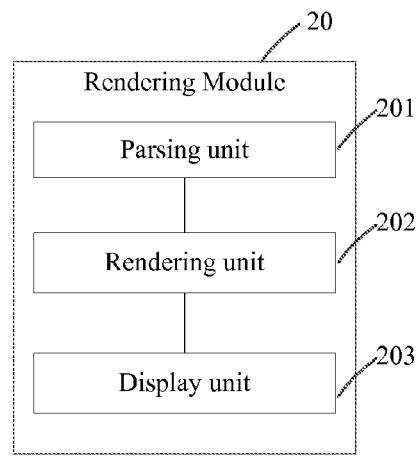
FIG. 2B depicts a structure diagram of a rendering module of an exemplary webpage display apparatus in accordance with various disclosed embodiments.

The rendering module 20 can render sub-blocks corresponding to the first current screen by using certain rendering methods. In one embodiment, the rendering module 20 can first parse elements corresponding to the sub-blocks, in order to provide essential information such that the elements can be rendered and then displayed on a screen. The rendering module 20 can then render the parsed-out elements. FIG. 2B shows an exemplary rendering module 20.

As shown in FIG. 2B, the rendering module 20 can include a parsing unit 201, a rendering unit 202, and a display unit 203. Certain units may be omitted and other units may also be included.

The parsing unit 201 is configured to parse elements in the sub-blocks corresponding to the first current screen, in order to extract essential information such that the elements can be rendered and then displayed on a screen. The rendering unit 202 is configured to render the parsed-out elements, which can include converting parsed-out elements into pixels as an output. The display unit 203 is configured to display the elements rendered by the rendering unit 202. In one embodiment, the display unit 203 is configured to accomplish the displaying of the rendered elements by outputting pixel data of the elements to the display module 40 for displaying.

The rendering module 20 can render the sub-blocks corresponding to the first current screen. In addition, the rendering module 20 can render sub-blocks adjacent to the first current screen. In one embodiment, the rendering module 20 can render sub-blocks within about one screen height from the top or bottom boundary of the first current screen, and/or sub-blocks within about one screen width from the left or right boundary of the first current screen. Thus, the rendering module 20 can render the sub-blocks of the four screens respectively adjacent to the four boundaries (i.e., the top, bottom, left and right boundaries) of the first current screen.

The buffer module 30 is configured to store the rendered sub-blocks adjacent to the first current screen.

In one embodiment, the buffer module 30 can store sub-blocks within about one screen height from the top or bottom boundary of the first current screen, and/or sub-blocks within about one screen width from the left or right boundary of the first current screen.

The display module 40 is configured to display the sub-blocks corresponding to the first current screen, and to read and display the rendered sub-blocks in the buffer module 30 when the screen moves.

The display module 40 can display the rendered sub-blocks corresponding to the first current screen. When scrolling or dragging of the webpage causes the current screen to change (e.g. the first current screen changes to a second current screen), the rendered sub-blocks in the buffer module 30 corresponding to the second current screen can be read and displayed.

When the position of the current screen changes, the display module 40 can retrieve, from the buffer module 30, the rendered sub-blocks corresponding to the second current screen, in order to display the sub-blocks.

The calling module 50 is configured to call the rendering module after the screen moves (e.g., the first current screen changes to the second current screen), to render sub-blocks adjacent to the second current screen and to store the rendered sub-blocks in the buffer module 30.

The calling module 50 can thus be configured to enable a render-display operation to be repeatedly performed. The render-display operation can be similar or the same as depicted in Steps S13-S14. In a specific example, the calling module 50 can call the rendering module to render sub-blocks adjacent to the second current screen and to store the rendered sub-blocks in the buffer module 30. When the screen moves again, the display module 40 can read and display the rendered sub-blocks corresponding to the next current screen (e.g., a third current screen) in the buffer module 30. The calling module 50 can then call the rendering module to render sub-blocks adjacent to the third current screen and to store the rendered sub-blocks in the buffer module 30.

According various disclosed embodiments, when the webpage display apparatus displays a first current screen, at the same time, sub-blocks adjacent to the first current screen can be continuously rendered at backstage and stored in a buffer module. When scrolling or dragging of the webpage causes the first current screen to change to a second current screen, the rendered sub-blocks in the buffer module corresponding to the second current screen can be retrieved and displayed. In comparison with the method of rendering an entire webpage all at once, the method as disclosed herein can result in less resource consumption. In addition, sub-blocks displayed on the current screen (e.g., the second current screen) have all been rendered beforehand. Thus, display speed can be fast. Phenomena such as white screen or flicker screen can also be prevented. So desired user experience can be achieved.

Optionally, the webpage display device 100 can further include a release module 60. The release module 60 is configured to release from the buffer module 30 the sub-blocks beyond preset distance(s) from one or more boundaries of the current screen (e.g., the first current screen).

In one embodiment, the release module 60 can be configured to release from the buffer module 30 the sub-blocks beyond about one screen height from the top or bottom boundary of the first current screen. Also, the release module 60 can be configured to release from the buffer module 30 the sub-blocks beyond about one screen width from the left or right boundary of the first current screen. Therefore, in one specific embodiment, the buffer module 30 can store at most the sub-blocks of the four screens adjacent to the boundaries of the first current display screen. Thus, internal memory can be effectively saved and system resource consumption can be reduced.

In addition, various disclosed embodiments also provide a computer-readable storage medium. The computer-readable storage medium (or computer-readable storage device, or computer-readable storage memory) can be configured to store therein computer-executable instructions. For example, the computer-readable storage medium can include, but is not limited to, non-volatile memories such as optical discs, hard disks, flash memories, etc. The computer-readable storage medium as disclosed can be used by computers or other similar computing devices to complete operations as follows.

First, a webpage to be displayed can be obtained. The webpage can be sectioned into a plurality of sub-blocks. Sub-blocks corresponding to a first current screen can be rendered and displayed. A render-display operation can be performed. First, sub-blocks adjacent to the first current screen can be rendered, and the rendered sub-blocks can be stored in a buffer. Next, when the screen moves, the rendered sub-blocks in the buffer corresponding to a second current screen can be read and displayed. Such render-display operation can be repeatedly performed. Thus, after the screen moves, sub-blocks adjacent to the second current screen can be rendered and stored in the buffer.

Optionally, after rendering the sub-blocks adjacent to the first current screen and storing such rendered sub-blocks in a buffer, the sub-blocks beyond preset distance(s) from one or more boundaries of the first current screen can be released from the buffer.

Further, during the releasing of the sub-blocks from the buffer, the sub-blocks beyond about one screen height from the top or bottom boundary of the first current screen can be released from the buffer.

Further, during the releasing of the sub-blocks from the buffer, the sub-blocks beyond about one screen width from the left or right boundary of the first current screen can be released from the buffer.

The rendering of the sub-blocks adjacent to the first current screen can include rendering sub-blocks within about one screen height from the top or bottom boundary of the first current screen.

The rendering of the sub-blocks adjacent to the first current screen can include rendering sub-blocks within about one screen width from the left or right boundary of the first current screen.

Further, in one embodiment, the rendering and displaying of the sub-blocks of the webpage corresponding to the first current screen can be detailed as follows. Elements in the sub-blocks corresponding to the first current screen can be parsed out first. The parsing herein can provide essential information such that the elements can be rendered and then displayed on a screen. The parsed-out elements can be rendered. The rendered contents (i.e., the rendered elements) can then be displayed.

According to various disclosed embodiments herein, sub-blocks of a webpage that correspond to a first current display screen can be displayed at first. At the same time, sub-blocks adjacent to the first current screen can be continuously rendered at backstage and stored in a buffer. When scrolling or dragging of the webpage causes the first current screen to change to a second current screen, the rendered sub-blocks in the buffer module corresponding to the second current screen can be retrieved and displayed. Thus, during the scrolling of the webpage, at same time as a current screen is displayed, sub-blocks adjacent to the current screen (i.e., the sub-blocks that correspond to a next current screen) can be continuously rendered at backstage. In comparison with the method of rendering an entire webpage all at once, the method as disclosed herein can result in less resource consumption. In addition, sub-blocks displayed on the screens have all been rendered beforehand. Thus, display speed can be fast. Phenomena such as white screen or flicker screen can also be prevented.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and apparatus can be used in a variety of Internet applications. By using the disclosed methods and systems, a webpage to be displayed can be obtained and sectioned into a plurality of sub-blocks. Sub-blocks corresponding to a first current screen can be rendered and displayed. Next, a render-display operation can be performed. In the render-display operation, sub-blocks adjacent to the first current screen can be rendered and stored in a buffer. When a screen moves, the rendered sub-blocks in the buffer corresponding to a second current screen can be read and displayed. The render-display operation can be repeatedly performed.

Thus, during the scrolling or dragging of the webpage, at same time as a current screen is displayed, sub-blocks adjacent to the current screen can be continuously rendered at backstage. In comparison with the method of rendering an entire webpage all at once, the method as disclosed herein can result in less resource consumption. In addition, sub-blocks displayed on the screens have all been rendered beforehand. Thus, display speed can be fast. Phenomena such as white screen or flicker screen can also be prevented. So desired user experience can be achieved.

What is claimed is:

1. A webpage display method, comprising:
obtaining a webpage to be displayed;
sectioning the webpage into a plurality of sub-blocks, including:
performing an initial parsing process on elements of the webpage;
obtaining position information of the elements of the webpage, wherein the position information of the elements of the webpage includes: positions of the elements in the webpage, and positions of the elements relative to a displaying screen; and
sectioning the webpage into the plurality of sub-blocks according to the obtained positions of the elements in the webpage and the obtained positions of the elements relative to the displaying screen;
rendering and displaying sub-blocks corresponding to a first current screen;
performing a render-display operation including:
rendering sub-blocks adjacent to the first current screen and storing the rendered sub-blocks adjacent to the first current screen in a buffer; and
when a screen moves, reading and displaying rendered sub-blocks in the buffer corresponding to a second current screen; and
after the screen moves, repeatedly performing the render-display operation;
wherein the method further comprises: using multi-thread processing of a processor for rendering the sub-blocks adjacent to the first current screen and storing the rendered sub-blocks adjacent to the first current screen in the buffer.

2. The method according to claim 1, further including:
after the rendering and storing of the sub-blocks adjacent to the first current screen,
releasing, from the buffer, previously stored sub-blocks beyond preset distances from boundaries of the first current screen.

3. The method according to claim 2, wherein the releasing of the sub-blocks includes:
releasing, from the buffer, sub-blocks beyond about one screen height from a top or a bottom boundary of the first current screen.

4. The method according to claim 1, wherein the rendering of the sub-blocks adjacent to the first current screen includes:
rendering sub-blocks within about one screen height from a top or a bottom boundary of the first current screen.

5. The method according to claim 1, wherein the rendering of the sub-blocks adjacent to the first current screen includes:
rendering sub-blocks within about one screen width from a left or a right boundary of the first current screen.

6. The method according to claim 1, wherein the rendering and the displaying of the sub-blocks corresponding to the first current screen includes:
parsing out elements in the sub-blocks corresponding to the first current screen;
rendering the parsed-out elements; and
displaying the rendered elements.

7. The webpage display method according to claim 1, wherein:
the elements in the webpage includes at least one of a text box, a label, a radio button, a picture control; and
each sectioned sub-block has zero to one or more of the elements.

8. A webpage display apparatus, comprising: a monitor and a processor configured to:
obtain a webpage to be displayed and section the webpage into a plurality of sub-blocks, including:
performing an initial parsing process on elements of the webpage;
obtaining position information of the elements of the webpage, wherein the position information of the elements of the webpage includes: positions of the elements in the webpage, and positions of the elements relative to a displaying screen; and
sectioning the webpage into the plurality of sub-blocks according to the obtained positions of the elements in the webpage and the obtained positions of the elements relative to the displaying screen;
render sub-blocks corresponding to a first current screen, and to render sub-blocks adjacent to the first current screen;
store the rendered sub-blocks adjacent to the first current screen;
display the sub-blocks corresponding to the first current screen, and to read and display the rendered sub-blocks corresponding to a second current screen when a screen moves; and
after the screen moves, render sub-blocks adjacent to the second current screen and store the rendered sub-blocks adjacent to the second current screen;
wherein the processor is further configured to use multi-thread processing of the processor for rendering the sub-blocks adjacent to the first current screen and storing the rendered sub-blocks adjacent to the first current screen in the buffer.

9. The apparatus according to claim 8, wherein the processor is further configured to:
release sub-blocks beyond preset distances from one or more boundaries of the first current screen.

10. The apparatus according to claim 9, wherein the processor is further configured to release sub-blocks beyond about one screen height from a top or a bottom boundary of the first current screen.

11. The apparatus according to claim 8, wherein the processor is further configured to render sub-blocks within about one screen height from a top or a bottom boundary of the first current screen.

12. The apparatus according to claim 8, wherein the processor is further configured to render sub-blocks within about one screen width from a left or a right boundary of the first current screen.

13. The apparatus according to claim 8, wherein the monitor and the processor are further configured to:
parse out elements in the sub-blocks corresponding to the first current screen;
render the parsed-out elements; and
display the rendered elements.

14. A non-transitory computer-readable medium having computer program for, when being executed by a processor, performing a webpage display method, comprising:
obtaining a webpage to be displayed;
sectioning the webpage into a plurality of sub-blocks, including:

performing an initial parsing process on elements of the webpage;

obtaining position information of the elements of the webpage, wherein the position information of the elements of the webpage includes: positions of the elements in the webpage, and positions of the elements relative to a displaying screen; and sectioning the webpage into the plurality of sub-blocks according to the obtained positions of the elements in the webpage and the obtained positions of the elements relative to the displaying screen;

rendering and displaying sub-blocks corresponding to a first current screen;

performing a render-display operation including:

rendering sub-blocks adjacent to the first current screen and storing the rendered sub-blocks adjacent to the first current screen in a buffer; and when a screen moves, reading and displaying rendered sub-blocks in the buffer corresponding to a second current screen; and after the screen moves, repeatedly performing the render-display operation;

wherein the method further comprises: using multi-thread processing of the processor for rendering the sub-blocks adjacent to the first current screen and storing the rendered sub-blocks adjacent to the first current screen in the buffer.

15. The computer-readable medium according to claim 14, the method further including:

after the rendering and storing of the sub-blocks adjacent to the first current screen, releasing, from the buffer, sub-blocks beyond preset distances from boundaries of the first current screen.

16. The computer-readable medium according to claim 15, wherein the releasing of the sub-blocks includes:

releasing, from the buffer, sub-blocks beyond about one screen height from a top or a bottom boundary of the first current screen.

17. The computer-readable medium according to claim 14, wherein the rendering of the sub-blocks adjacent to the first current screen includes:

rendering sub-blocks within about one screen height from a top or a bottom boundary of the first current screen.

18. The computer-readable medium according to claim 14, wherein the rendering of the sub-blocks adjacent to the first current screen includes:

rendering sub-blocks within about one screen width from a left or a right boundary of the first current screen.

19. The computer-readable medium according to claim 14, wherein the rendering and the displaying of the sub-blocks corresponding to the first current screen includes:

parsing out elements in the sub-blocks corresponding to the first current screen;

rendering the parsed-out elements; and displaying the rendered elements.

* * * * *